United States Patent [19]

Baran

[11] Patent Number: 5,097,350
[45] Date of Patent: Mar. 17, 1992

[54] METHOD AND APPARATUS FOR ADAPTING AN ELECTROSTATIC COPIER MACHINE TO A PLAIN PAPER FACSIMILE TRANSCEIVER

[75] Inventor: Paul Baran, Atherton, Calif.
[73] Assignee: Interfax, Inc., Menlo Park, Calif.
[21] Appl. No.: 533,828
[22] Filed: Jun. 6, 1990
[51] Int. Cl.$^5$ ............................................. H04N 1/32
[52] U.S. Cl. ..................................... 358/401; 358/476
[58] Field of Search ............... 358/471, 474, 476, 401, 358/296

[56] References Cited

U.S. PATENT DOCUMENTS

| | | | |
|---|---|---|---|
| 4,027,961 | 6/1977 | Starkweather | 355/3 R |
| 4,046,471 | 9/1977 | Branham et al. | 355/14 |
| 4,188,113 | 2/1980 | Hiraga | 355/51 |
| 4,204,725 | 5/1980 | DiStefano et al. | 355/3 R |
| 4,241,990 | 12/1980 | Fisli | 355/11 |
| 4,379,631 | 4/1983 | Kitamura | 355/14 R |
| 4,575,214 | 3/1986 | Carley | 355/3 R |
| 4,647,178 | 3/1987 | Sasaki et al. | 355/3 R |
| 4,696,562 | 9/1987 | Urata et al. | 355/3 R |
| 4,752,806 | 6/1988 | Haas et al. | 355/3 R |
| 4,794,419 | 12/1988 | Shibazaki et al. | 355/3 R |
| 4,814,798 | 3/1989 | Fukae et al. | 346/160 |
| 4,821,107 | 4/1989 | Naito et al. | 358/256 |
| 4,849,815 | 7/1989 | Streck | 358/471 |
| 4,905,098 | 2/1990 | Sakata | 358/476 |

OTHER PUBLICATIONS

R. A. Thorpe, "Triple Function Box", IBM Technical Disclosure Bulletin, vol. 15, No. 10, Mar. 1973, pp. 3259–3260.
D. L. Buddington, "Copier Having Facsimile Scan/Print Function", IBM Technical Disclosure Bulletin, vol. 23, No. 1, Jun. 1980, pp. 75–78.
Tibor S. Fisli, "Multifunction Document Processor", Proc. SPIE Int. Soc. Opt. Eng., vol. 397, pp. 20–27 (1983).
Mark R. Bond, "Versatile OEM . . . Functions", Mini--Micro Systems, pp. 221–228.
"Canon Unveils . . . Products", Purchasing Jun. 27, 1985, pp. 83, 87.
Samuel Jay Kalow, "What to Seek . . . Ease of Use", The Office, Jul. 1986, pp. 19, 22.

*Primary Examiner*—Stephen Brinich
*Attorney, Agent, or Firm*—Phillips, Moore, Lempio & Finley

[57] ABSTRACT

A converter applique that fits onto and retrofits existing low priced plain paper electrostatic copiers is discussed herein. The applique of the present invention contains all of the additional elements needed to provide the full functionality of a plain paper facsimile transceiver. Additionally, the applique of the present invention removably mounts on a plain paper copier and converts it to serve as a facsimile transceiver while preserving the functionality of the copier even when the applique is in place on the copier. Further the applique of the present invention makes no electrical contact with the internal circuits of the copier, and only makes mechanical contact to the non-movable portions of the outer case of the copier where it is positioned precisely to align the laser beam in the applique with the photosensitive drum within the copier.

18 Claims, 17 Drawing Sheets

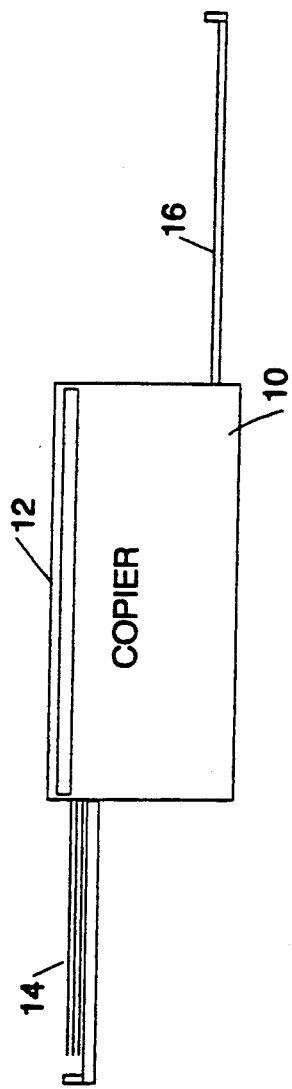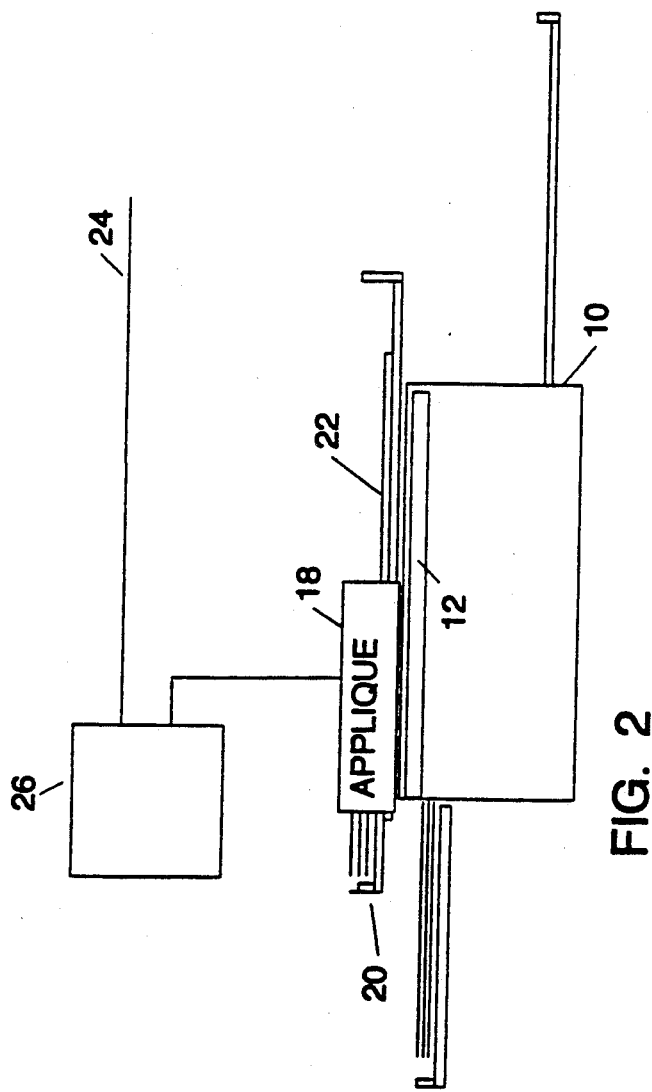

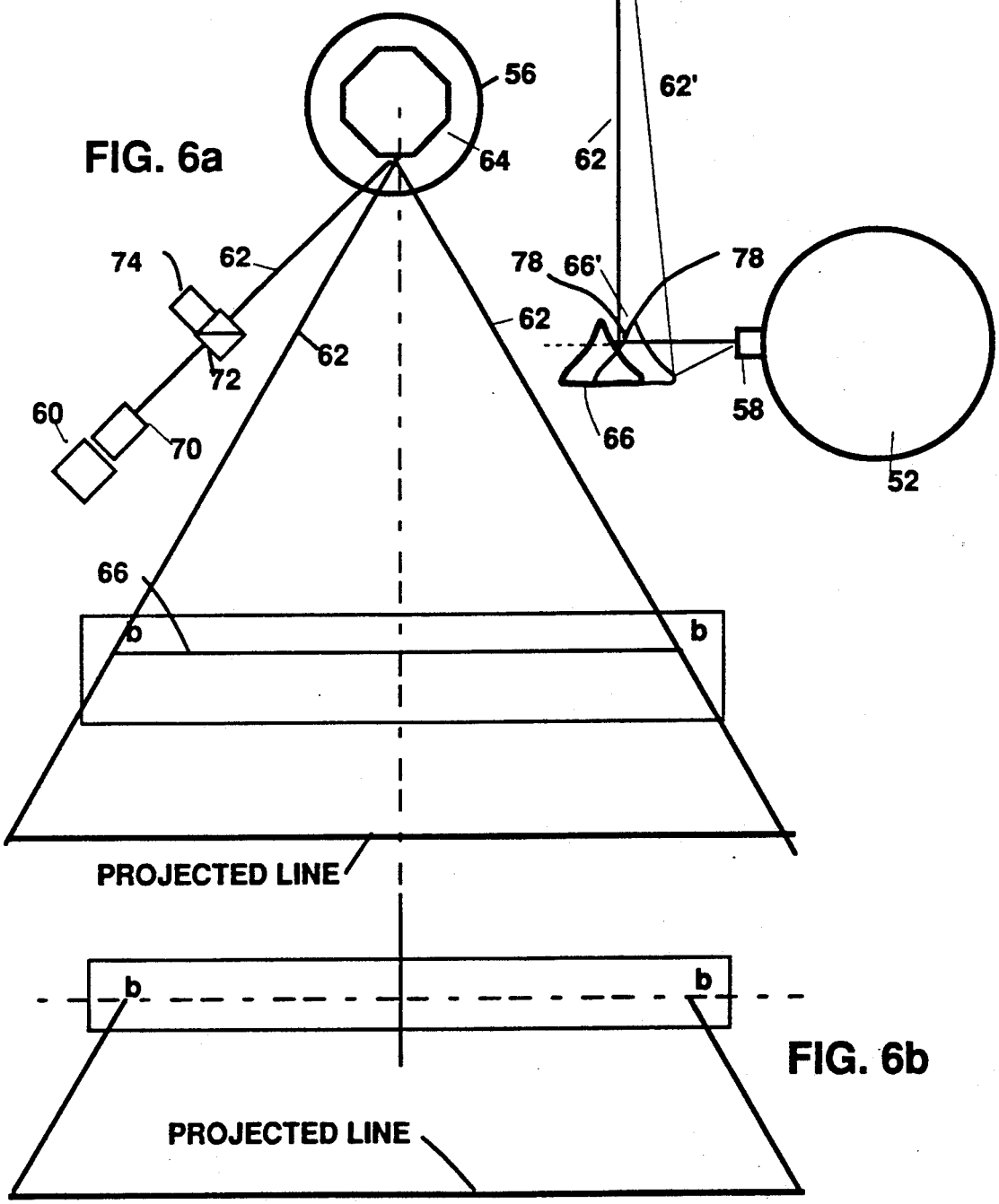

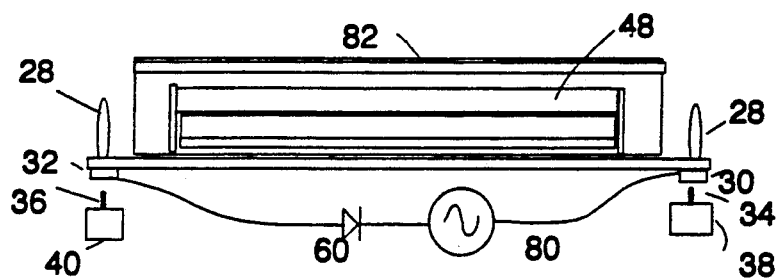
FIG. 8a
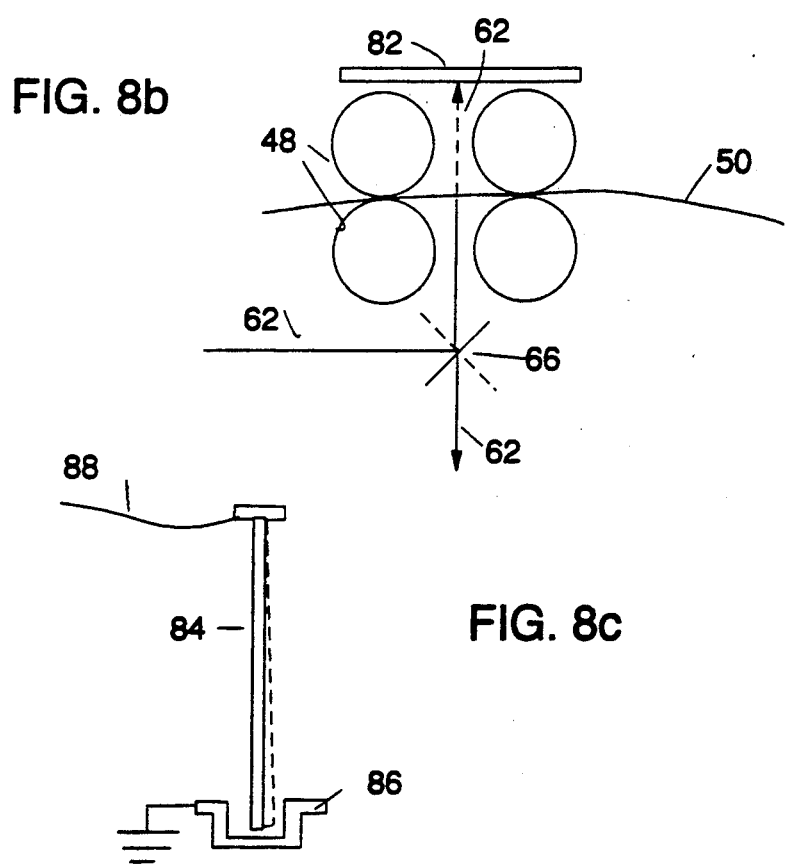
FIG. 8b
FIG. 8c

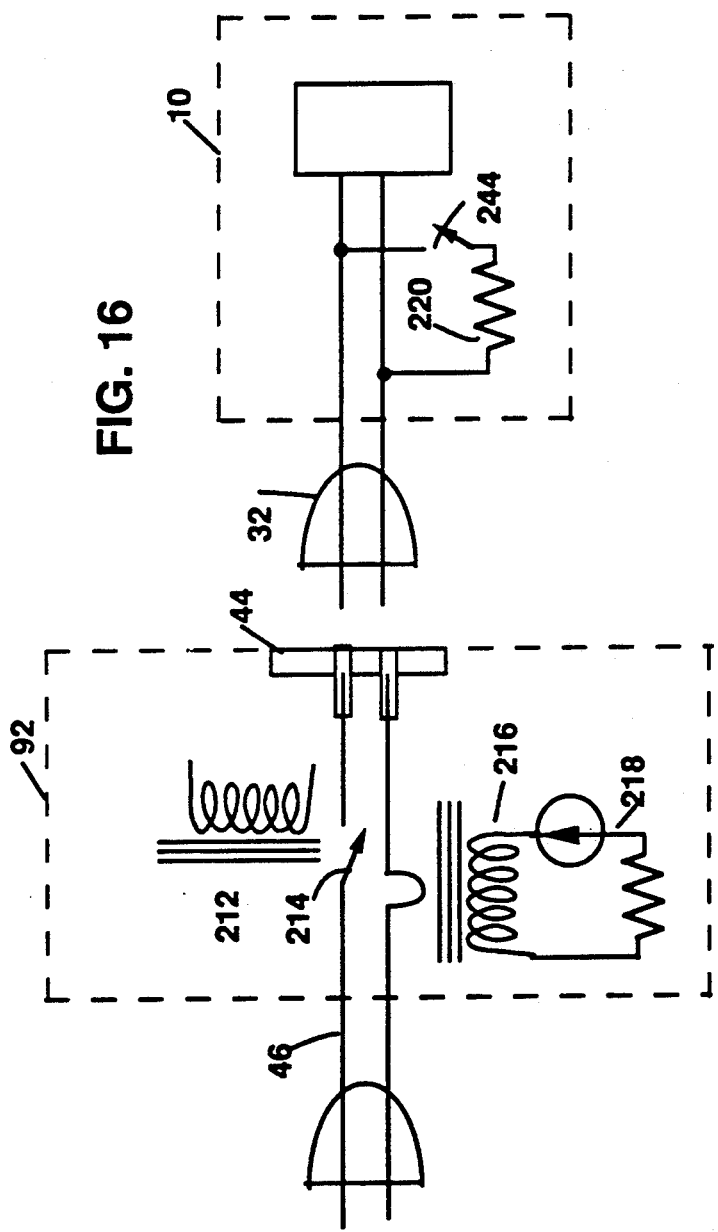

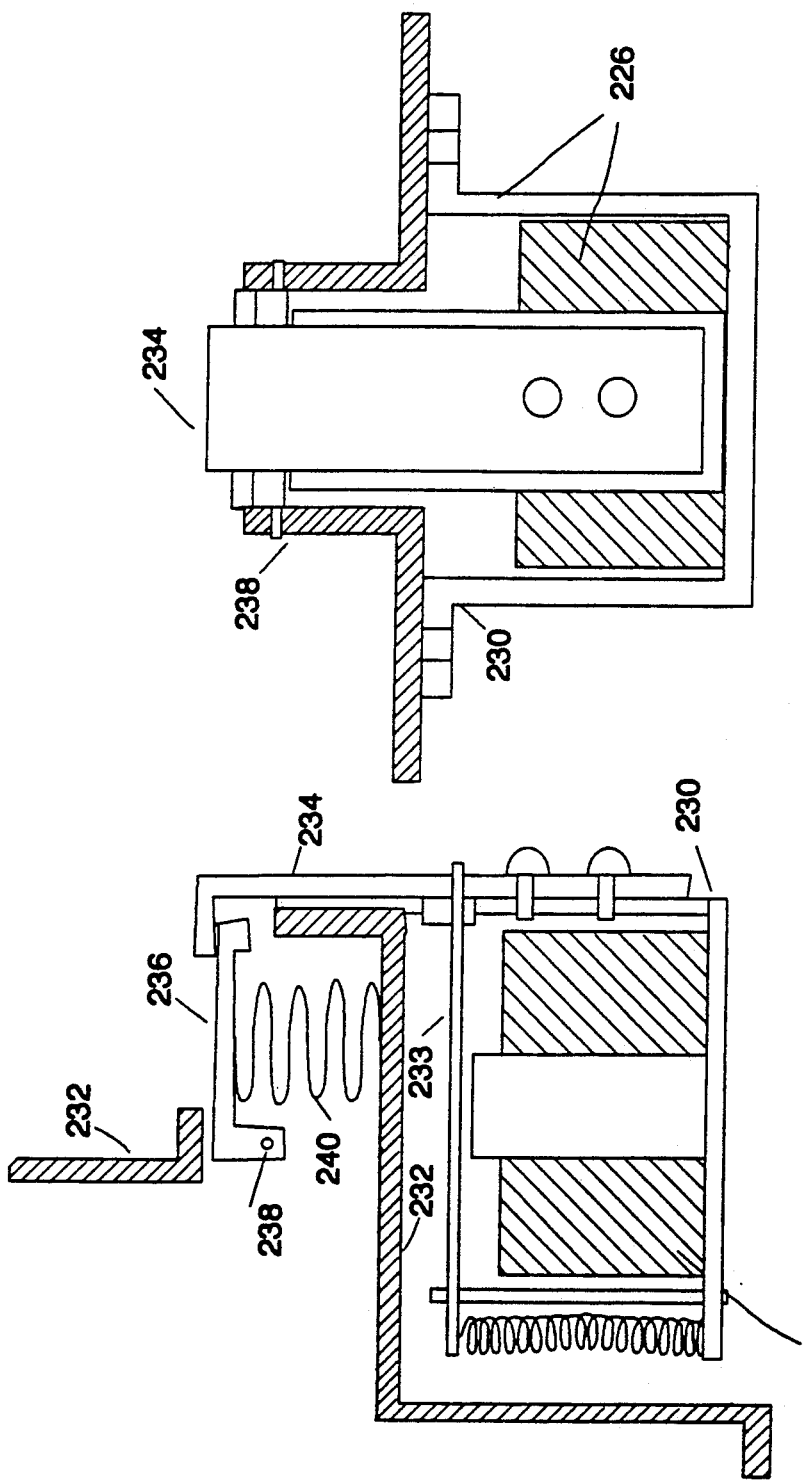

METHOD AND APPARATUS FOR ADAPTING AN ELECTROSTATIC COPIER MACHINE TO A PLAIN PAPER FACSIMILE TRANSCEIVER

BACKGROUND OF THE INVENTION

1. Field of the Invention

The present invention relates to plain paper facsimile transceivers, namely to the method and apparatus for modifying, or retro-fitting, an existing low cost plain paper electrostatic copy machine to operate as a facsimile transceiver, as well as copier with the addition of a removable applique.

2. Description of the Prior Art

The majority of facsimile transceivers sold today incorporate a thermal printer for the received document despite the customer's clear preference for documents on plain paper. While there are plain paper facsimile machines in the marketplace, they carry a price tag that is at least four times the price of a thermal printer facsimile machine with the same features. The lowest cost plain paper facsimile technology available today uses a thermal print head for heating and transferring the received image from a mylar ink ribbon to a plain paper sheet. With these units the cost of the consumable ribbon becomes a major cost factor with significant usage of such a machine.

Given the high cost of an electrostatic printing facsimile machine, many organizations have their thermal printer facsimile machines located in close proximity to an electrostatic copier machine. This allows the receiver of the facsimile transmission to immediately copy the thermal printout from the facsimile machine and make a plain paper copy of it. This also results in a high consumables cost where the facsimile machine is heavily used.

Another option is the use of a computer with a facsimile modem card together with computer laser printer to provide plain paper receiving capability. A limitation of this approach is the lack of a scanner capability for transmitting documents already printed. To complete this system to make it totally useful requires a stand-alone full page scanner. Both the laser printer and the scanner are high cost items which makes this approach less attractive.

The demand for a fully integrated plain paper facsimile machine has been documented in several publications, for example an article that appeared in *Network World* on June 12, 1989, by Bruce Guptill entitled "Gee Whiz! why not a fax/scanner/printer/copier/phone/PC?". The present invention presents such a system.

Since the same unit can also serve as a printer, the closest art known to the applicant are combined copier/printers. The closest copier/printers are disclosed by Starkweather (U.S. Pat. No. 4,027,961) and Carley (U.S. Pat. No. 4,575,214). Starkweather describes a printer attachment for a high speed flash type copier which uses a moving photoreceptor belt. Starkweather's copier attachment contains a moving laser scanner. This scanner projects a raster image, a scan line at a time, onto the copying area. The scanner head in the attachment is physically moved from scan line to scan line positions to paint an entire image to be printed onto an implied temporarily fixed position photoreceptor. Upon the completion of reception of the image, the photoreceptor belt is advanced to accept the next image to be printed.

Carley also describes a printer attachment for a copier of the same type as does Starkweather, and specifically distinguishes his invention from that of Starkweather. Carley rotates the axis of the scanning head 90 degrees to permit simultaneous movement of either the photoreceptor or of the laser writing head to accomplish the scanning function. His approach assumes a fixed platen copier attachment wherein scanning occurs by movement of the copier's optical system with a moving laser beam directed into the field lens of the copier to allow the copier's moving optics to do the scanning.

Carley's approach is directed towards flash type copiers as noted in his patent at Col. 4, lines 3–22:

"For strobe-illumination copiers, such as the Xerox 8200, no further copier modification is required. However many copiers, such as this using drums, mechanically scan the original, rather than strobing it by moving the document glass, the lens 7, and/or internal mirrors such as 6. Copiers with such scanning mechanisms must be examined or a case-by-case basis and certain copiers will prove difficult to convert with my apparatus. However, most such mechanisms can be disabled easily by removing a part from the drive mechanism such as a pin or set-screw, or similar action, and a tool to perform this disablement would be part of the installation kit for a given copier. Once these reciprocating parts are disabled (frozen) these copiers will take my apparatus just like a strobe-type copier. For example, the curved-glass Xerox 3600 series copiers use a reciprocating mirror 6 which can be harmlessly jammed into the extreme retrace position to disable the scan. This procedure takes just seconds to do, or undo, with the proper tool."

Carley's embodiment does not appear to meet his stated objectives of a truly removable applique that is used in conjunction with a copier that remains useful. For example, while Carley seeks (Col. 1, lines 41–46):

"... a further object that the apparatus be easily and quickly removed and the copier restored to an unaltered state ... no significant alteration to the copiers and so will not invalidate copier service contracts ..."

It is believed that his disclosed embodiments do not teach how this is to be accomplished.

It is also noted that Starkweather and Carley both consider only of fixed glass platen copiers with the device used with them requiring that they electrically interconnect to the internal circuitry of the copier.

It is advantageous to have a facsimile applique that does not need to be interconnected with the internal wiring of the copier with which it is used, that no internal mechanical changes be required even on a temporary basis, that can be easily and quickly attached and removed to and from the copier that it is to be used with the necessary alignment procedure being a relatively easy one, and that can be used with the least expensive plain paper electrostatic copiers having moving platens.

SUMMARY OF THE INVENTION

In accordance with the preferred embodiment of the present invention there is provided a converter applique that fits onto and retrofits existing low priced plain paper electrosensitive copiers. The applique of the present invention contains all of the additional elements needed to provide the full functionality of a plain paper facsimile transceiver. Additionally, the applique of the present invention mounts on the plain paper copier and converts it to serve as a facsimile transceiver while preserving the functionality of the copier. The applique of the present invention makes no electrical contact with the internal circuits of the copier, and only makes mechanical contact to the non-movable portions of the outer case of the copier where it is positioned precisely to align the laser beam in the applique with the photosensitive drum within the copier.

In another embodiment of the present invention there is an applique that is removably mounted on a plain paper electrostatic copier having a moving document transparent platen and internal photoreceptor means with said applique mounted above and spaced-apart from said platen after removal of the platen cover without modification of the copier. In this embodiment the applique is a system having the functions of a copier, a laser printer for a computer, a laser document scanner, and a laser facsimile receiver and transmitter. Included are housing means for containing the components of the applique, means for initiating normal copier action externally to said copier, means for monitoring the position of the platen as it moves across the top of the copier and to derive timing signals from the moving platen that are indicative of the position of the photoreceptor means within the copier. Additionally, there is included means for receiving a data stream that is representative of the pixelization of a document line by line, laser means aligned with the photoreceptor means for exposing it with light in a spectral density range that will sensitize the photoreceptor means, means for modulating the laser means with the received data stream to selectively expose the photoreceptor means in response to the data stream, and means for focusing and deflecting the light emitted by the laser means to linearize the swept light onto the photoreceptor means under control of the timing signals from the monitoring means to make a copy from the data stream.

In another embodiment of the present invention there is an attachment for converting an existing plain paper electrostatic copier into a facsimile transceiver. This includes means for receiving a data stream that is representative of the pixelization of a document line by line, means for scanning the image on a document, means for converting the scanned image of the document to a pixelized data stream and applying same to the means for receiving a data stream, and means for writing onto a photoreceptor means of the copier with a light beam modulated by the data stream from the means for receiving a data stream. Also included are transceiver means for selectively transmitting and receiving facsimile images via a communications channel, and control means for permitting user selection of the facsimile transmission or reception mode and for coordinating the necessary means for execution of that function.

Yet another embodiment of the present invention is an applique apparatus to be removably mounted on a plain paper electrostatic copier having a moving document transparent platen and internal photoreceptor means after removal of the platen cover without modification of the copier to convert the copier into a laser printer. The applique apparatus includes a universal housing for use with a large number of different sized and shaped copiers, mounting means for external attachment to the copier to removably support the housing means above and spaced apart from the moving document transparent platen. Also included are document receiving means located in the housing for receiving a data stream representation of a document to be printed, laser diode scanning, synchronization and control means contained in the housing for modulating the laser diode with the data stream to create a modulated laser beam and for directing the modulated laser beam to the photoreceptor means of the copier for writing the document onto the photoreceptor means, and baseplate means sized and shaped to fit the copier and to be removably affixed to the mounting means on the copier for receiving and precisionaly locating the universal housing means so that the laser beam is aligned to write the document onto the photoreceptor means.

BRIEF DESCRIPTION OF THE FIGURES

FIG. 1 is a pictorial front view of a conventional plain paper copier with a transporting platen on top for moving the document to be copied across the top of the copier.

FIG. 2 is a pictorial front view of the copier of FIG. 1 with the applique of the present invention shown mounted thereon with connections to a telephone line and a personal computer.

FIGS. 6a-c are simplified top, end and side views of the optical scanner portion of the applique of the present invention.

FIGS. 8a-c illustrate the safety precautions of the present invention to prevent viewing of the light beam from the laser diode by the naked eye.

FIG. 16 is a schematic representation of the line cord from the copier plugged into the applique to provide the applique with the ability to determine when the copier is ready to copy.

FIGS. 17a-b are two views of the relay actuator used to depress the edge of the start button of the copier without interfering with the normal use of the copier's start button for making copies.

DESCRIPTION OF THE PREFERRED EMBODIMENT

Figure 3:
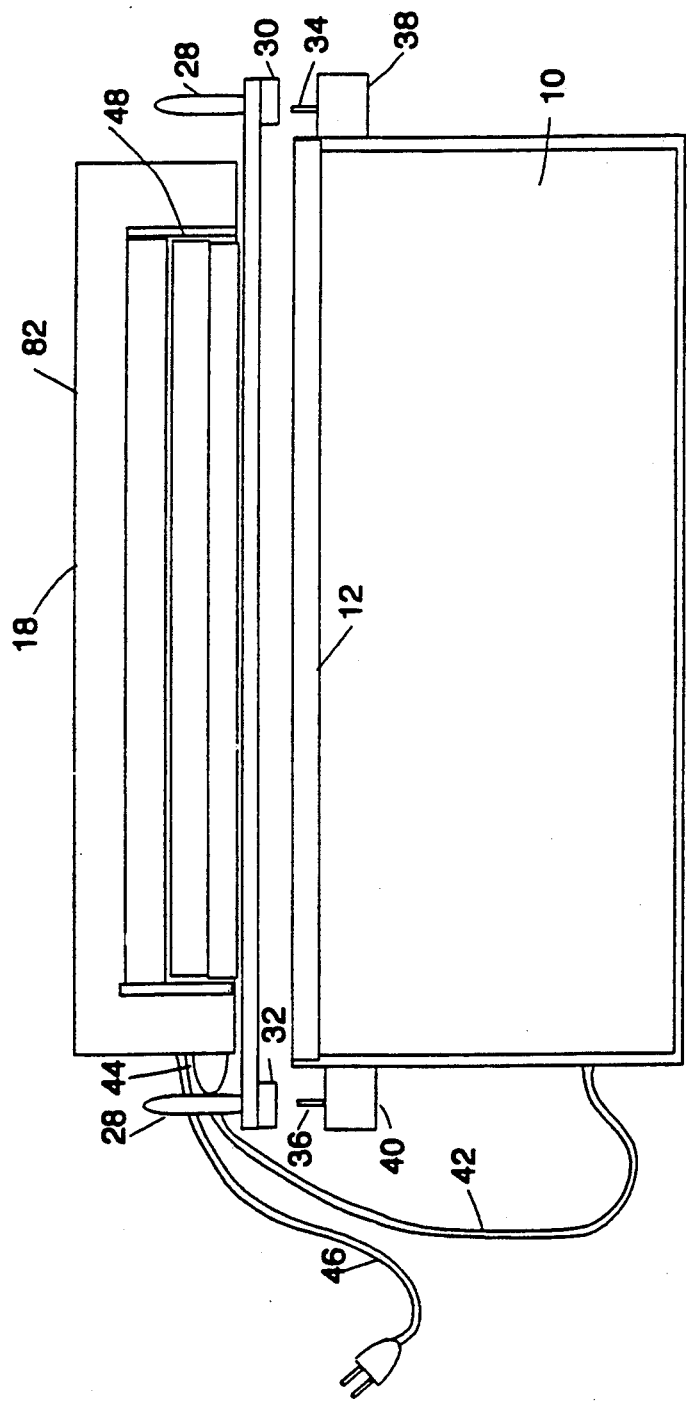
FIG. 3 is a simplified left end view of the copier and applique as shown in FIG. 2.

In conceptual terms, the present invention is an applique converter to be removably mounted on a plain paper electrostatic copier so that the combination functions as a plain paper facsimile machine that can optionally interface directly with a personal computer to permit the facsimile transmission from either hard copy or from computer memory, as a plain paper computer laser printer, as a high speed document scanner for storing a preprinted document in the memory of the computer, and as a plain paper electrostatic copier.

The present invention is a device to fit onto a low cost personal copier and three important considerations in the creation of a general purpose applique to retrofit existing copiers are that each copier is of a different size and configuration, that each copier operates at a slightly different speed, and it is necessary to deduce information and send control signals without benefit of wire connections between the copier and the applique. A singular distinguishing feature of the lowest priced plain paper electrostatic copiers is that almost all of them use a moving glass platen. Further, while each of these copiers is a different size and shape, the differences are small.

To keep the overall price of the present invention down in the market place the applique of the present invention has been designed specifically to be useful with a wide variety of plain paper electrostatic copiers, including the lowest cost copiers which tend to use a moving glass platen to move the document being copied across a fixed position slit with its image being projected onto the drum cartridge photoreceptor. Material to be copied is placed face down on the glass platen and the cycle started. The physical movement of the glass platen moves the document to be copied across an illuminated narrow slit coinciding with a light slit in the rotating drum cartridge photoreceptor.

To minimize cost, the use of a low cost plain paper electrostatic copier as a starting point is assumed. Small plain paper copiers suitable for use with the applique of the present invention are available form multiple sources at a street price of approximately $450. A typical copier of this description is the Canon PC-5 II. By experimentation it has been determined that in such applications a laser diode that emits light in the range of 850-890 nanometers at a power level between 1 and 10 milliwatts will achieve the desired results of the present invention. While the present invention is not restricted for use solely with moving platen machines, and it is clear that fixed platen units may be used with obvious modifications once the present invention is understood, the following description addresses adding the applique to moving platen type copiers.

The applique is mounted to the copier case so that it does not move together with the moving platen, and it is physically positioned in a fixed manner relative to the photoreceptor drum cartridge within the plain paper copier. The mounting means allow removing the applique from the copier so that the copier can be used without the applique and without causing significant interference to its normal copier operation.

Referring first to FIG. 1 there is shown a front plan view of a prior art plain paper electrostatic copier 10. Copier 10 includes a document platen 12, an input paper tray 14, and an output paper tray 16. For purposes of this invention, platen 12 is of the type that moves across the top of copier 10 during the copying process.

In FIG. 2, copier 10 of FIG. 1 is shown with applique 18 of the present invention mounted on top of copier 10 and spaced apart from platen 12 with the opaque cover removed from platen 12. When applique 18 is installed it does not move and platen 12 is free to move normally below it. Applique 18 includes an input tray 20 for receiving documents to be scanned for facsimile transmission or for storage in the memory of the computer, depending on the selected mode of the system. Also included is output tray 22 for receiving pages that have been scanned by applique 18. Further, this figure shows a telephone line 24 and a personal computer 26 interfacing with applique 18.

FIG. 3 is a simplified left side view (as defined by the orientation of FIG. 2) of applique 18. This is the side that the document to be scanned enters applique 18. Handles 28 are shown along the front and back edges of applique 18 with each handle having a mounting receptacle 30 and 32, respectfully, extending downward from it for mating with mounting posts 34 and 36, respectively, which extend upward from mounting blocks 38 and 40, respectively, which are affixed to the front and back of copier 10, respectively. Also shown in FIG. 3 is copier power cable 42 which is shown plugged into power socket 44 on applique 18, and applique power cable 46 which is to be plugged into a standard wall power outlet. This arrangement permits the easy removal and installation of applique 18 to and from copier 10 without having to interface with the internal circuitry of copier 10 other than through copier power cable 42. Also, drive rollers 48 advance documents to be scanned by applique 18.

Figure 4:
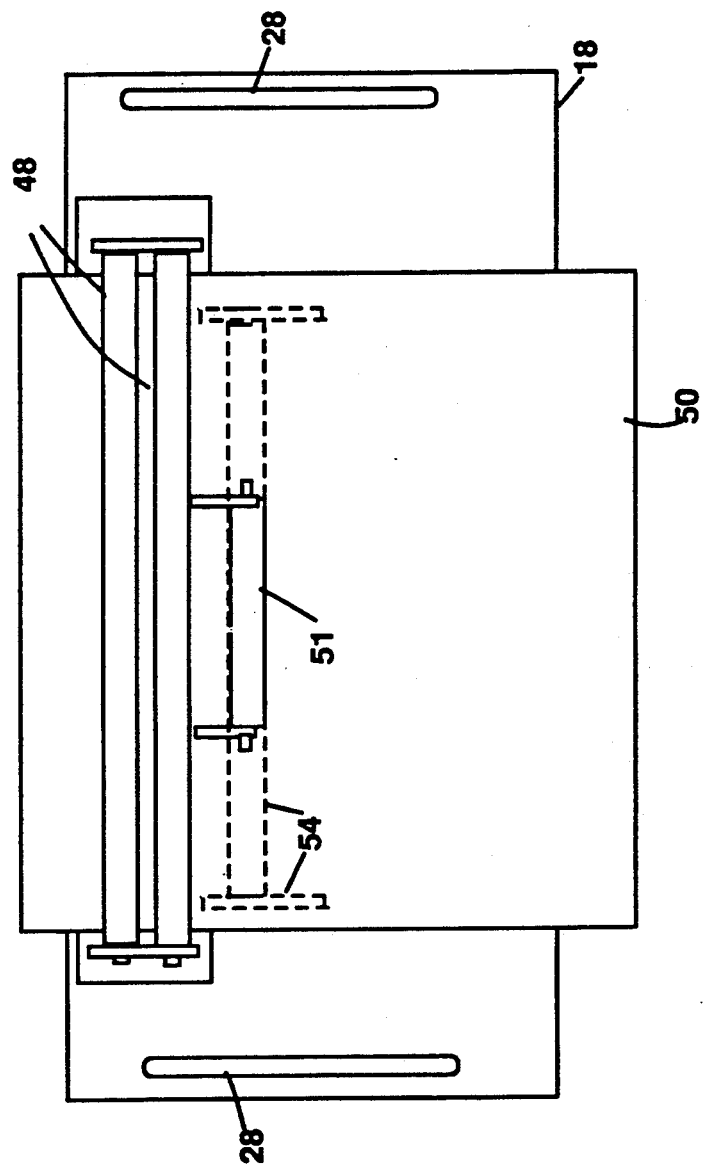
FIG. 4 is a pictorial top view of the applique of the present invention with the cover removed from over the drive roller as a sheet of paper is being scanned, and the applique oriented so that the left side as per the orientation of FIG. 2 is at the bottom of this figure.

FIG. 4 is a top view of applique 18 with the left side as defined by the orientation of FIG. 2 at the bottom of this figure. To assist in the understanding of the operation of applique 18, the cover 82 (see FIGS. 3 and 5) over paper drive rollers 48 has been omitted from this view. A single sheet of paper 50 is shown in this figure being advanced into applique 18 to be scanned. Initially the documents are loaded into input paper tray 20 beneath pressure roller 51 face down and in the order in which they are to be scanned. The documents are fed from the bottom of the stack in input tray 20. A sheet feed injector 54 driven by the electronics of applique 18 moves the bottom document into the driven paper drive rollers 48 past the scanning point.

Figure 5:
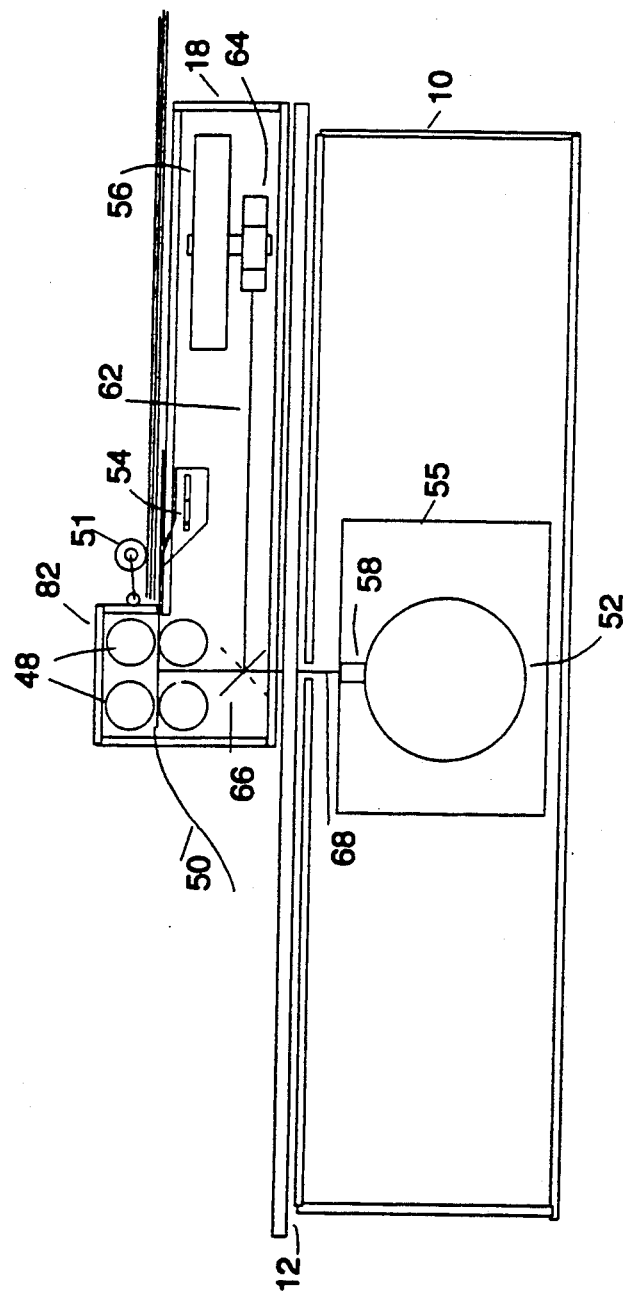
FIG. 5 is a vertical cross-sectional view of the copier and applique as viewed from the back as defined by the orientation of FIG. 2.

Referring next to FIG. 5, there is shown a simplified vertical cross-sectional view of the copier 10 and applique 18 as viewed from the back, as defined by the orientation of FIG. 2. This figure is included to show the relationship between the key components of copier 10 and applique 18. In copier 10 the orientation of a removable cartridge 55 containing a photoreceptor drum 52 and a fiber optic face plate 58 are shown. In applique 18 there is a spinner motor 56 that rotates an eight-sided mirror 64 at a constant speed. Off to one side (see FIG. 6a) there is a laser diode 60 producing coherent light within the photosensitive range of photoreceptor 52 that is positioned to direct a laser beam 62 at rotating mirror 64 and is scanned by the rotation of mirror 64 in beam 62 across mirror 66. Beam 62 is reflected either upward or downward by two position elongated mirror 66. For scanning a document 50 being advanced by paper drive rollers 48, the necessary position for mirror 66 is as shown in FIG. 5 with the laser beam being modulated by the density of the printing on the surface of document 50 and reflected back via mirror 66 toward the source of the laser (see FIG. 6a). For printing a document from the computer or a received document when applique 18 is in the facsimile receiving mode, mirror 66 is rotated to the dotted position in FIG. 5 to direct laser beam 62 downward to fiber optic face plate 58 through light slit 68 to photoreceptor drum 52 for making a copy of the document.

FIGS. 6a–c show more of the details of the scanning of laser beam 62 either across the document being scanned or across fiber optic face plate 58. In either case the line to which the beam is reflected is called the projected line in FIGS. 6a and b. In FIG. 6a laser beam 62 is shown as being scanned through a triangular region from mirror 64 to the "projected line" as being in a single plane. In reality, the scanned laser beam 62 is reflected either upward or downward along line b—b by elongated mirror 66 of FIG. 5. In FIG. 6b the portion of the scanned laser beam 62 that is reflected into a vertical plane around line b—b is shown being reflected downward.

Referring again to FIG. 6a there is shown a laser diode 60 with its beam passing through a collimator 70 then a beam splitter 72, and then to mirror 64 which is being rotated at a constant speed by spinner motor 56. If beam 62 is being used to scan a document 50 (FIG. 5) for facsimile transmission or storage in computer memory, the beam is reflected back to beam splitter 72 where the reflected light is directed to photo-cell detector (laser receiver diode) 74. A signal from photo-cell detector 74 is applied to laser pixel drivers and receivers block 76 of FIG. 9 for facsimile transmission or to computer 26 for storage in memory.

Moving on to FIG. 6c there is shown a simplified side view of the components for scanning the laser beam 62 across the projected line. A spinner motor 56 has attached to its rotating shaft the multi-faced rotating mirror 64. The fact that multi-faced mirror 64 is mounted on a shaft, laser beam 62 may have what has become known as "wobble" as illustrated by laser beams 62 and 62'. This can result from a face of mirror assembly 64 being set other than parallel to the shaft on which the mirror assembly rotates or if the shaft of motor 56 is bent. Additionally, the individual faces of mirror assembly 64 may not be flat. To over come the wobble problem, elongated mirror 66 (FIG. 5) incorporates elliptical surfaces. The mirrors 66 and 66' position is moved laterally for positioning the appropriate mirror surface at line b—b to either reflect the laser beam upward or downward depending on the operational mode of the applique 18. In one position 66 reflects laser beam 62 downward to fiber optic face plate 58, and in its second position mirror 66' reflects laser beam 62 upward to scan document 50 (FIG. 5). In this figure it can be seen that the elliptical surface 78 reflects both beam 62 and beam 62' to the same location on fiber optic face plate 58 despite the wobble of the laser beam. This correction mechanism is also used when document 50 is scanned.

Figure 7A:
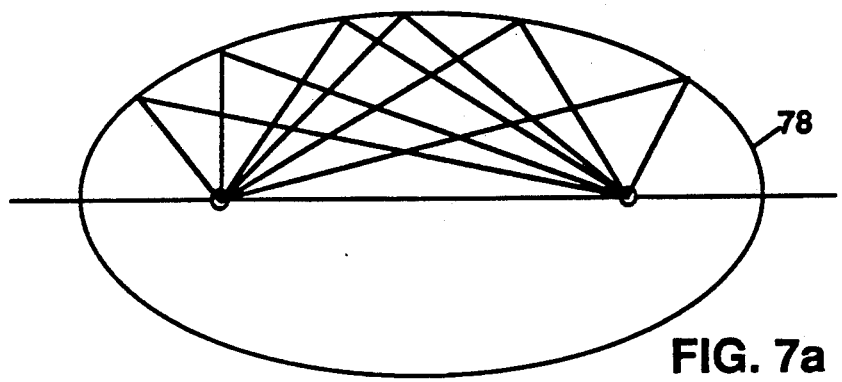
FIGS. 7a-b are graphical representations of the focussing properties of an ellipse.
Figure 7B:
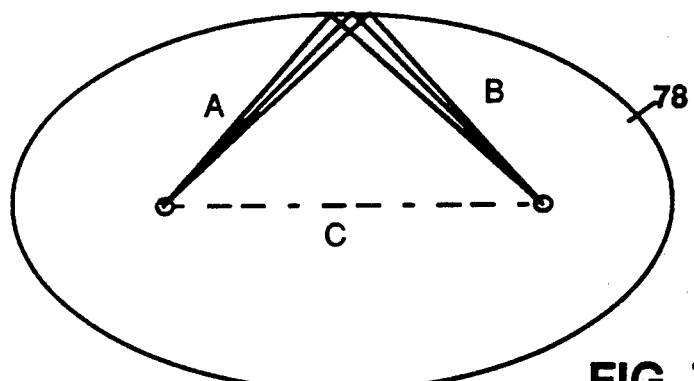
Figure 7C:
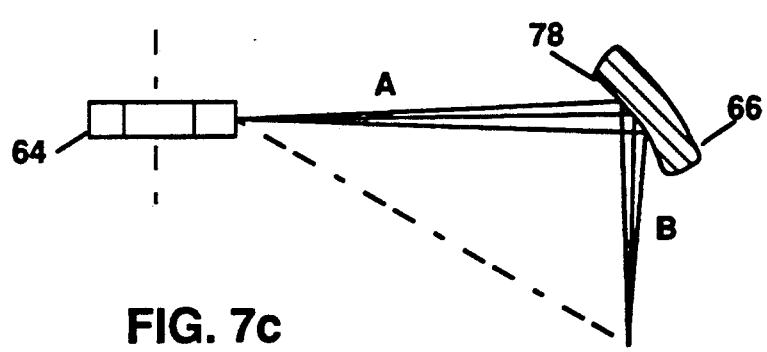
FIG. 7c is a side view graphical representation of the use of an elliptical cross-section mirror to remove the vertical or wobble error of the rotating multi-faceted laser beam scanning mirror.

FIGS. 7a–c illustrate how the use of a mirror 78 with an elliptical surface eliminates the wobble of laser beam 62. In FIG. 7a a family of rays are shown emanating from one of the focuses of the ellipse at different angles. All of the rays are reflected from the inner surface of the ellipse to the second focus of the ellipse. FIG. 7b illustrates the same phenomena with each of the beams being separated from each other by only a small angle and being reflected from one focus to the other focus. To apply this phenomena to the problem of wobble of the laser beam being reflected by rotating scanning mirror 64, the face of mirror 64 from which the laser beam is being reflected is considered one of the focal points of an ellipse and the point to which that beam is being projected as the other focal point of the same ellipse. The elliptical mirror surface 78 is curved to form an elliptical section of an ellipse to focus light from the first focus point to the second over the distance A+B. Distance A will be the same for either the scanning or the copying modes, however, distance B may be different for each of those modes of operations. If distances B are different, then the curvature of the two mirrored surfaces 78 are different so that the image at the desired projected line is in focus.

FIG. 8a shows two circuits used to prevent the light beam from laser diode 60 from being seen by the naked eye. In FIG. 8a the laser diode circuit comprising a series combination of a laser diode 60 and a power source element 80 conducts only when applique 18 is in position on copier 10. Mounting posts 34 and 36 via mounting receptacles 32 and 30 serve as a conduction path for the current through laser diode 60.

From FIG. 8b it can be seen that light blocking cover 82 prevents laser beam 62 from being seen in the upward direction.

In FIG. 8c a tilt detecting device such as a weighted pendulum 84 is illustrated. Pendulum 84 is intermediate a circular contact element 86 that is connected to ground and a signal line 88. When applique 18 is tilted, pendulum 84 will swing from verticle and make contact with element 86 causing ground to be applied to line 88 which triggers microprocessor 90 (FIG. 9) to remove power from laser diode 60. When applique unit 18 is mounted properly on copier 10 there should be no electrical contact between pendulum 84 and circular contact 86.

Figure 9:
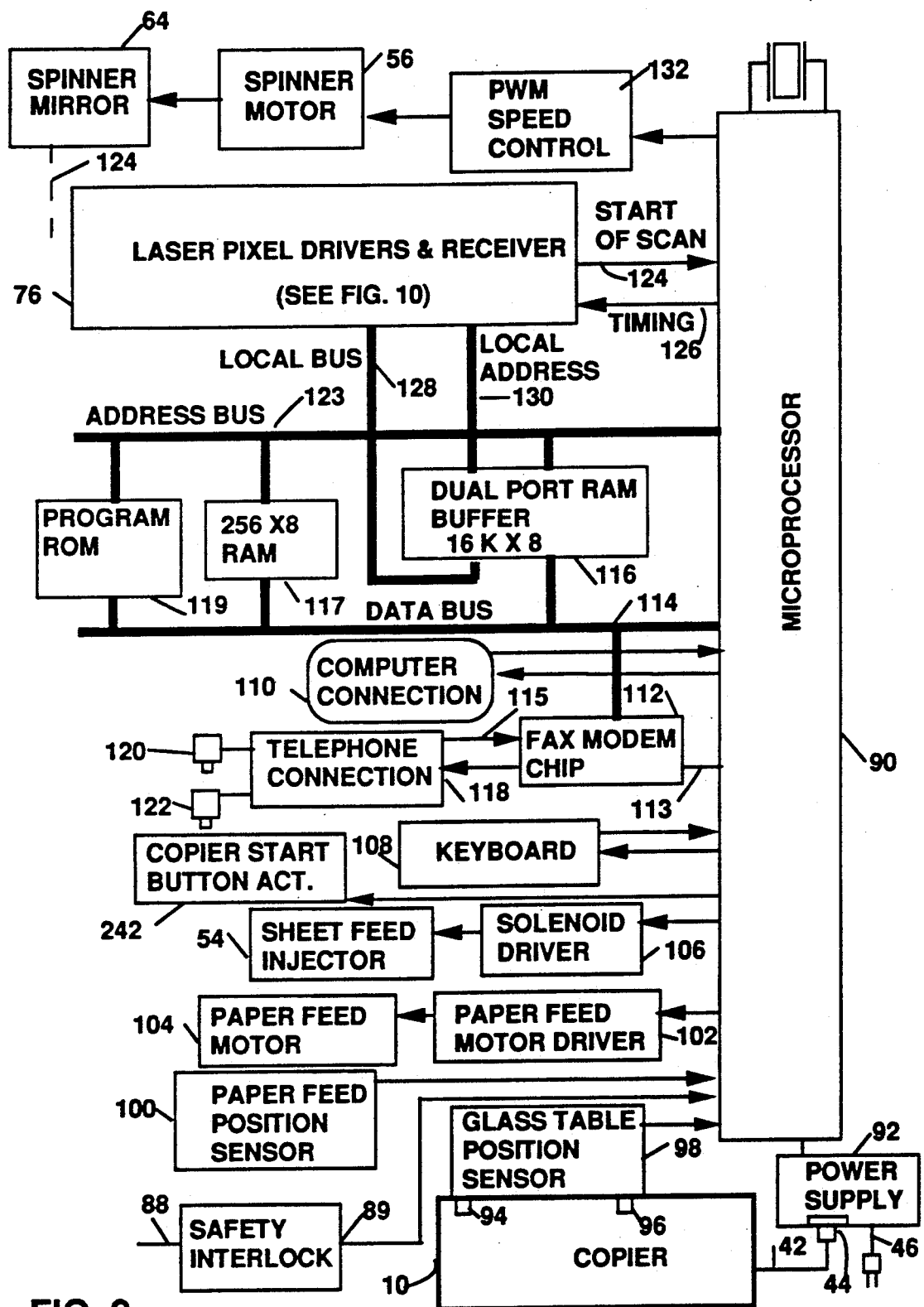
FIG. 9 is a system block diagram of the applique electronics.
Figure 10:
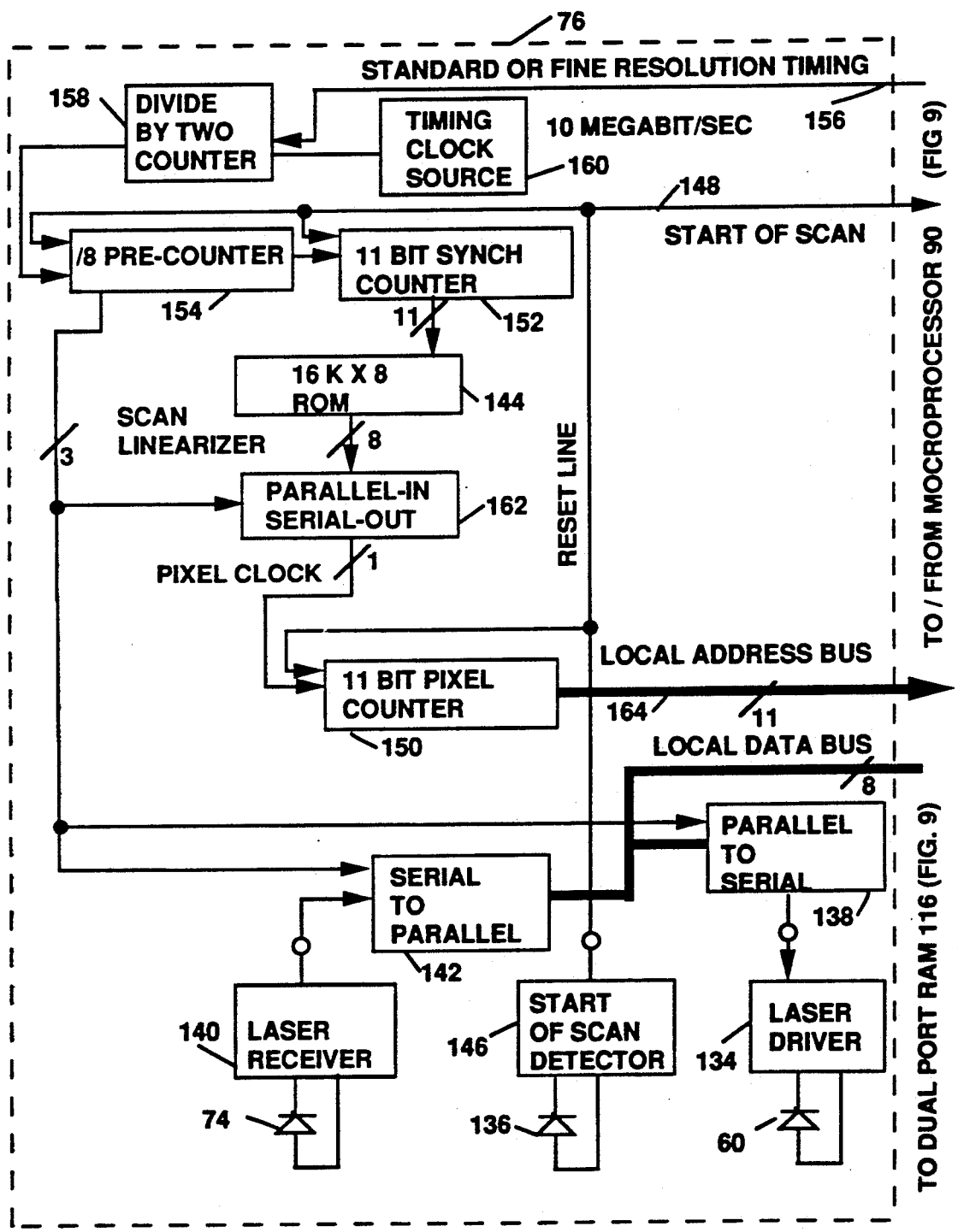
FIG. 10 is a detailed schematic block diagram of the laser pixel driver and receiver of FIG. 9.

FIG. 9 shows a block diagram of the electronics of applique 18 which are built around microprocessor 90. Starting at the bottom of that figure there is a power supply 92 which is powered from a convenient wall outlet via cable 46 with power supply 92 powering all circuits of applique 18. Plugged into power socket 44 of power supply 92 via cable 42 is copier 10. Mechanically aligned with platen 12 on the top of copier 10 and electrically connected to microprocessor 90 is a glass table position measuring means used to detect velocity and motion of platen 12. In the preferred embodiment two reflective adhesive spots 94 and 96 are applied to the platen 12. Glass table platen position sensor 98 contains an LED and a photocell. When either of the two reflecting marks 94 and 96 pass by the glass table position sensor 98 a signal is produced that is sent to microprocessor 90. Experimental measurements show that the translational speed of platen 12 tends to be linear over the length of its copying path. By measuring the transit time using a gated clock register in the microprocessor 90, and then dividing that period into equal time intervals provides the key timing chain measurement which is shown in FIG. 10. This relationship is used to coordinate the speed at which the laser scans and at which document 50 is advanced through applique 18. A velocity measurement of materials being scanned for transmission is accomplished in a similar manner using the paper feed position sensor 100. This provides a feed back signal to microprocessor 90 as to the velocity at which document 50 is being scanned and moved through applique 18.

Microprocessor 90 also controls paper feed motor driver 102, which in turn controls paper feed motor 104 which drives paper drive rollers 48 to advance document 50 as it is being scanned. A solenoid driver 106 under control of microprocessor 90 is provided to actuate sheet feed injector 54 which contains pressure roller 51 to give document 50 its initial push into paper drive rollers 48. Paper drive rollers 48 advance document 50 across the scanning line at a constant velocity coordinated with the rotational speed of drum 52 matching the velocity of the receptor sheet of paper (not shown) onto which the copy is made while being advanced through copier 10.

Keyboard 108 interfaces with microprocessor 90 to provide capability for user control of the functioning of the machine, e.g. selecting the mode of operation, and to dial the telephone number to which facsimiles are to be sent, etc. A serial connection 110 is optionally provided to attach a remote computer or printer to microprocessor 90. Also a safety interlock circuit 89 having a signal that indicates applique 18 is in place and in a horizontal position also is connected to microprocessor 90. FAX modem chip 112 is controlled by microprocessor 90, interfaces with data bus 114 and telephone line 115 via telephone connection 118 and telephone jacks 120 and 122. The function of FAX modem chip 112, together with microprocessor 90 depending on the direction of transmission, is to compress/decompress and format/reformat the data to/from data bus 114 and signals being sent between this and a remote facsimile machine. The decompressed data received, or to be sent, is transferred to/from dual port RAM buffer 116. For an incoming facsimile, enough information is feed to RAM buffer 116 for each line of the image to be printed prior to being printed by copier 10. RAM buffer 116 is loaded with the pixels needed to print a single line. After each line is printed, the next line of pixels is computed. Since laser beam 62 has about a 50% duty cycle there is enough time between the printing of each line to gather data and compute the pixel positions for the next line before laser beam 62 again scans fiber optic face plate 58.

RAM 117 and program ROM 119 are each connected between data bus 114 and address bus 123 to store documents to be sent at a later time, or to store incoming documents until they can be printed or transferred to memory of an associated personal computer.

Laser pixel drivers and receiver block 76 receives a start of scan optical signal 148 (in FIG. 10) from spinner mirror 64 and provides microprocessor 90 with a start of scan electrical signal on line 124. Microprocessor 90, in turn, provides block 76 with a timing signal on line 126 that is derived from the speed at which drum 52 is rotating, etc. Block 76 is also interconnected with dual port RAM buffer 116 via local data bus 128 and local address bus 130 to store the scanned pixels from an input document 50. The operational details of this block are discussed below with respect to FIG. 10.

FIG. 9 also shows PWM (pulse width modulation) speed control unit 132 that receives a speed synchronizing signal from microprocessor 90 that is dependent on the rotational speed of drum 52 in copier 10. Speed control 132 controls spinner motor 56 to cause spinner mirror 64 to rotate at the proper speed so that the scanning speed of laser beam 62 is synchronized with the rotational speed of drum 52.

The details of laser pixel drivers and receiver block 76 are shown in FIG. 10. Included here is laser diode 60 that is under control of laser driver 134, start of scan photo-diode 136, and reflected laser beam photo-diode 74. When laser beam 62 from laser diode 60 reaches the beginning of a scan line, laser beam 62 illuminates start of scan photo-diode 136 which is mounted at the start of scan edge of mirror 66 (see FIGS. 6a and 6c).

If the system is in the mode for receiving a facsimile or to print a document from the memory of a computer, laser driver 134 is activated by data being delivered from dual port RAM 116 in FIG. 9 via parallel to serial converter 138 to modulate laser diode 60 for scanning a line of the document onto drum 52 of copier 10. If the selected mode is to scan a document for transmission as a facsimile or to record that document in the memory of the computer, laser diode 60 is powered without being modulated to simply scan the document. The modulation of laser beam 62 in this mode is by the reflected beam being modulated by the difference in density between the background of the document and the image thereon. The modulated reflected beam is reflected back toward the source diode 60, however, as discussed with respect to FIG. 6a, the reflected beam is intercepted by beam splitter 72 and directed to diode 74. The modulated signal received by diode 74 is applied to laser receiver 140 which buffers the signal pulses and then transfers them to serial to parallel converter 142 for transfer to dual port RAM 116 (FIG. 9).

The moving laser beam 62 scans a constant angle per fixed unit of time. A ROM 144 look-up table approach is used to linearize the beam scan. The address at which each pixel is stored across the scan line is varied so that the image printed will have substantially even spacing between adjacent pixels, i.e. the resulting scan is linear. This is accomplished by the balance of the circuitry shown in this figure. ROM 144 is a look-up table; given a bit count on its address line, ROM 144 provides the corrected address so that the printed line of pixels is linearized.

The start of scan pulse is triggered by laser beam 62 illuminating the photodiode 136 feeding the start of scan detector 146. That start of scan pulse on line 148 resets counters 150, 152 and 154, and is delivered to microprocessor 90 on line 124 in FIG. 9 from line 148 in FIG. 10. In response to the start of scan pulse, microprocessor 90 sends block 76 a timing signal on line 156 which controls divide by two counter 158. Also shown applying a signal to counter 158 is timing clock source 160 that operates at about 10 megabits/sec. Based on the desired resolution, number of pixels per inch, the timing signal on line 156 determines whether or not divide by two counter 158 is to be activated or not. For standard resolution, counter 158 is not activated and the resolution is determined by the clock rate of timing source 160; for fine resolution, counter 158 is activated and the rate from source 160 is divided by two thus increasing the resolution to twice as many pixels per inch.

The standard or fine resolution timing pulse train is applied to modulo 8 pre-counter 154 which is a ripple counter with each count of eight being applied to parallel to serial converters 138 and 162, and to serial to parallel converter 142, to define each eight bit byte of data. The signal ripples through counter 154 into 11 bit synch counter 152. For each bit time applied to ROM 144 on its address line, ROM 144 provides the corresponding corrected address at which the data is stored or is to be stored in dual port RAM 116. The corrected address from ROM 144 is then applied to parallel to serial converter 162 and then to 11 bit pixel counter 150 which applies the address to local address bus 164 to store the corresponding data on local data bus 166 in the corrected location of dual port RAM 166.

Figure 11A:
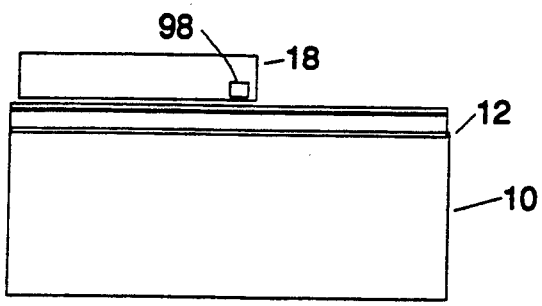
FIGS. 11a-d is a simplified side view of the moving glass platform of the copier illustrating the determination of the position of the platform as the copier is in use.
Figure 11B:
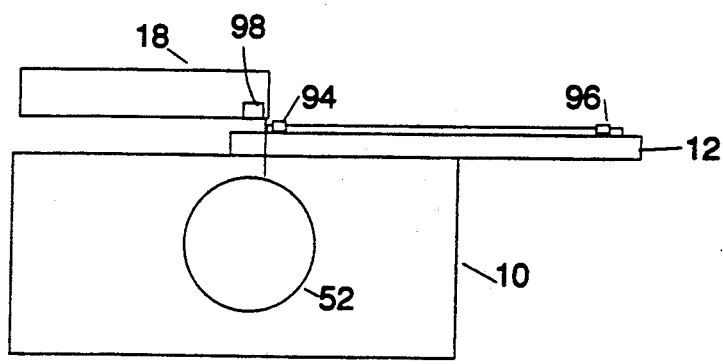
Figure 11C:
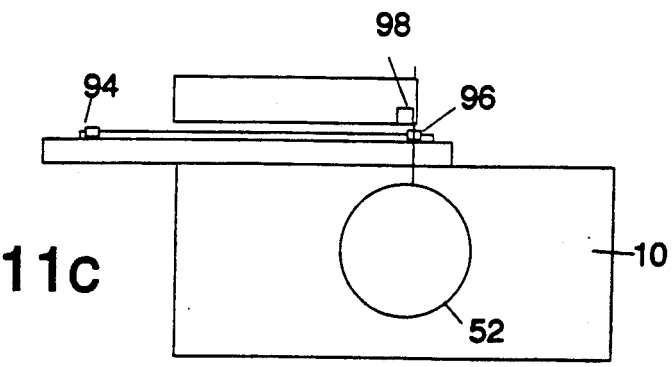
Figure 11D:
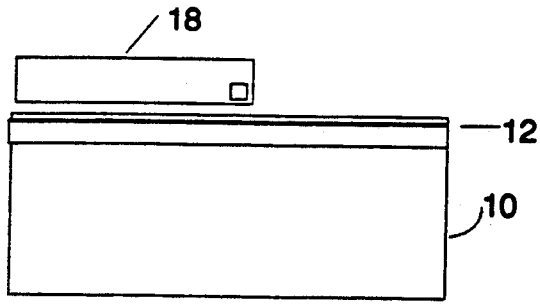

Since there are no electrical interconnections with the control circuits within copier 10 to measure the rotation of the photoreceptor drum 52, another method was created in the present invention to make that determination so that laser beam 62 scans drum 52 at a rate that will produce undistorted copies. The translational speed of platen 12 is mechanically synchronized with the rotation of drum 52, within the copier 10 at the time of manufacture. A measurement of the translational speed of platen 12 thus can be used to estimate the rotational speed on drum 52 within the accuracy level required in this application. Platen 12 is initially in its centered rest position as shown in FIG. 11a, platen 12 moves to a first extreme of its path of travel in preparation for making a copy as shown in FIG. 11b, platen 12 then is transported at a substantially uniform speed to the other extreme of its travel as the document to be copied is scanned and its image applied to drum 52 with the other extreme of travel being shown in FIG. 11c, and then platen 12 returns to its starting position after the copy has been made as shown in FIG. 11d. To make that measurement, two reflective marks 94 and 96 are placed along one edge of platen 12, each of which will come beneath platen position sensor 98 on the underside of applique 18 when platen 12 is at its two extremes of travel as shown in FIGS. 11b and 11c. Sensor 98 can be implemented as an LED/photocell combination which causes a counter within microprocessor 90 to start its count when the reflective spots 94 and 96 come beneath sensor 98 and to stop the count when reflective spot 96 after 94 comes beneath sensor 98. Whenever copier 10 is printing, platen 12 is first transported back and forth once across the top of copier 10. This motion is measured to determine the scan rate of laser beam 62 to synchronize that speed with the rotational speed of drum 52. Knowing the scan rate for laser beam 62 allows the speed of spinner motor 56 to be adjusted accordingly. From experimental data it has been determined that the scan rate of laser beam 62 does not have to be precise, in an absolute sense, provided that it is relatively uniform. Since the speed does not change much through the operation of the copier, the translational speed of platen 12, with most copiers, need only be measured when the copier is initially turned on. The corresponding value of the laser beam 62 scan rate could also be stored in memory.

Figure 11E:
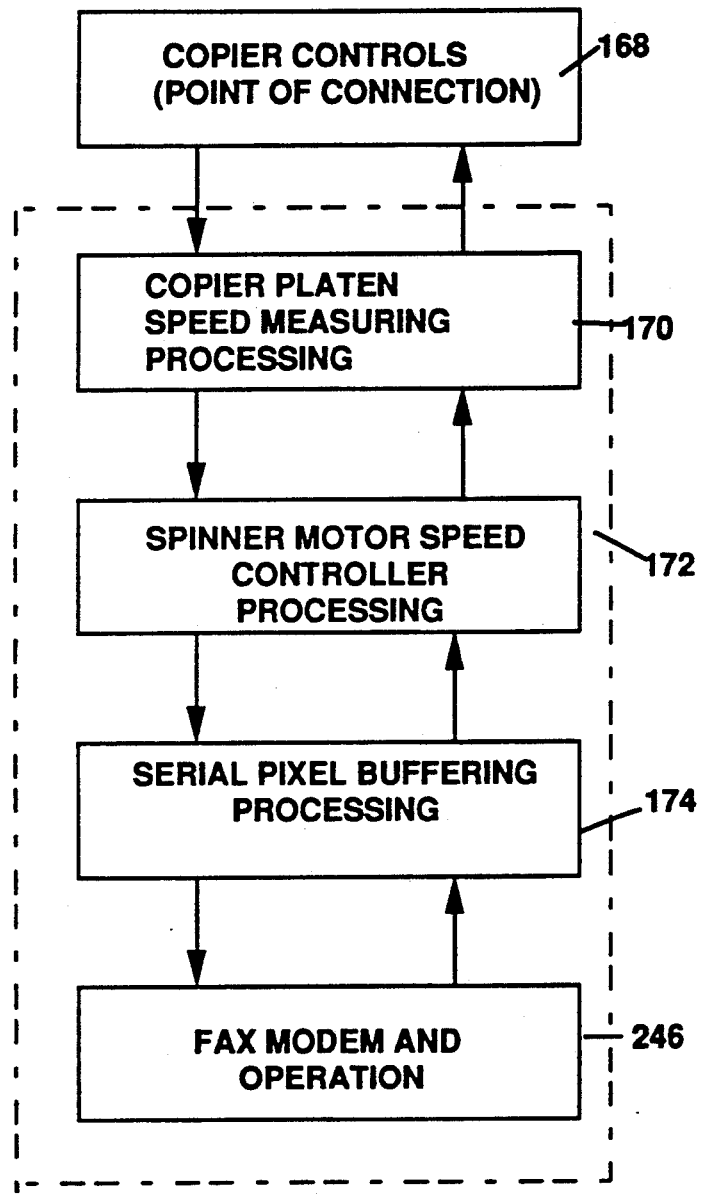
FIG. 11e is a flow chart of the system timing of the moving platen and rotating drum of the copier with which the present invention is to be utilized.

FIG. 11e is a simplified block diagram that illustrates the system timing. The circuits have been defined physically in FIGS. 9 and 10, while FIG. 11e illustrates their functional operation. The timing cycle is started when the start button of copier 10 is actuated (electronically) (block 168). The platen 12 speed measuring processing (block 170) provides the basic timing information to control motor 56 via spinner motor speed controller processing (block 172). This in turn controls the pixel buffering processing (block 174). Block 174 is followed by block 246, the operation of FAX modem chip 112.

Figure 12:
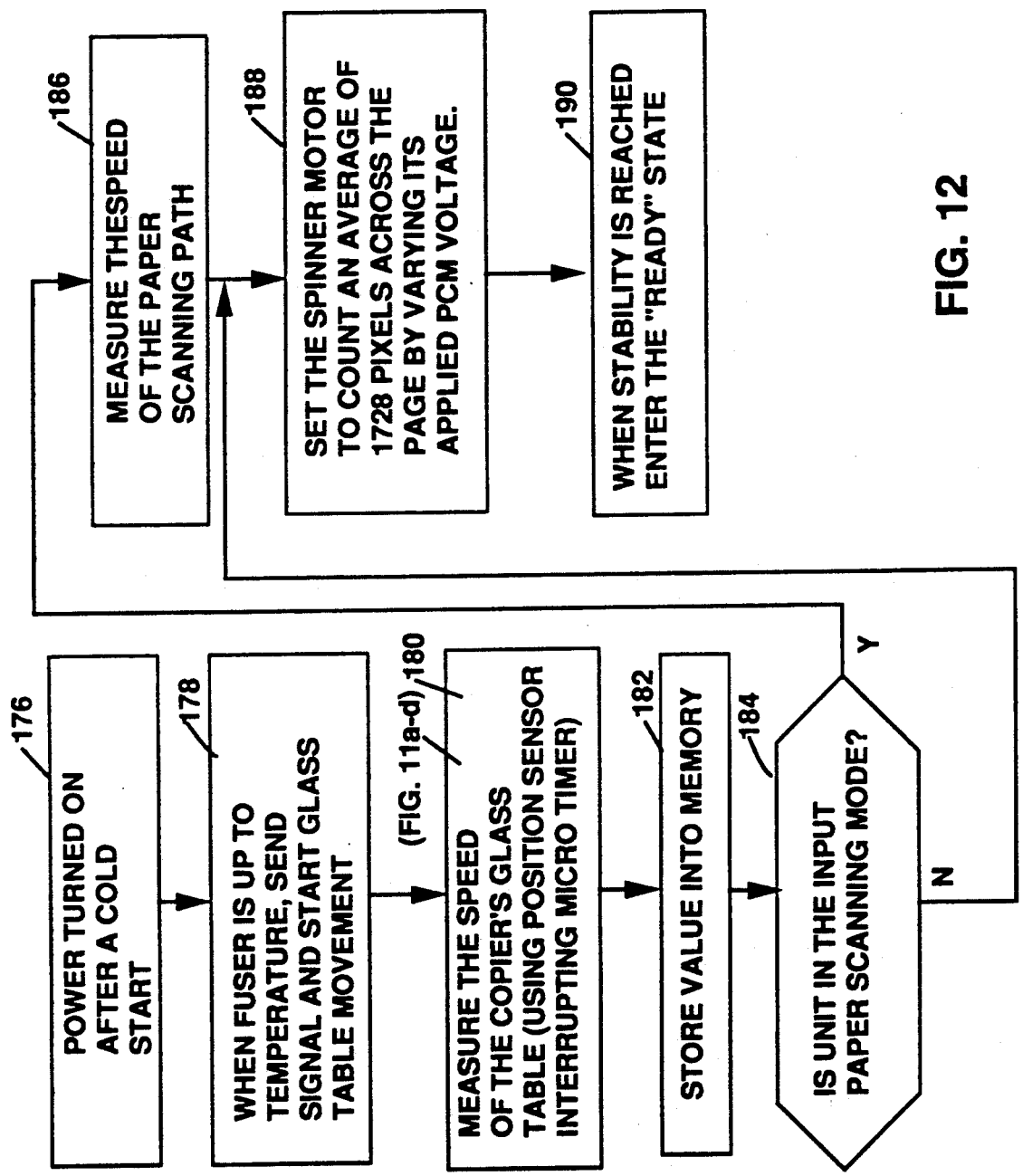
FIG. 12 is a flow chart of the scanning self-calibration process.

FIG. 12 provides a more detailed flow diagram of the timing arrangement. When copier 10 is turned on after a cold start (block 176), a thermostat within the copier itself prevents copier 10 from operating until the fuser section is up to temperature (block 178). Immediately upon reaching operating temperature after the start button was earlier depressed, the glass platform begins its movement cycle. The method of determining the velocity of the glass platform has been previously described (block 180). Two alternative sources of timing information are required. Sometimes the unit is used as a FAX receiver where the timing is determined by the glass platform's motion and velocity is stored (block 182). However the same scanning hardware is also used as an input scanner to read materials to be sent. Here the paper moving motor determines the scanning speed (block 186). Thus a decision is made as to the mode in effect (block 184). The speed of the spinner motor is set to always paint 1728 pixels (at standard resolution) across the width of the page. This is done by pulse width modulation (block 188) of the spinner motor until the exact desired speed is reached, at which time the unit is ready to enter the next stage of its operation (block 190).

Figure 13:
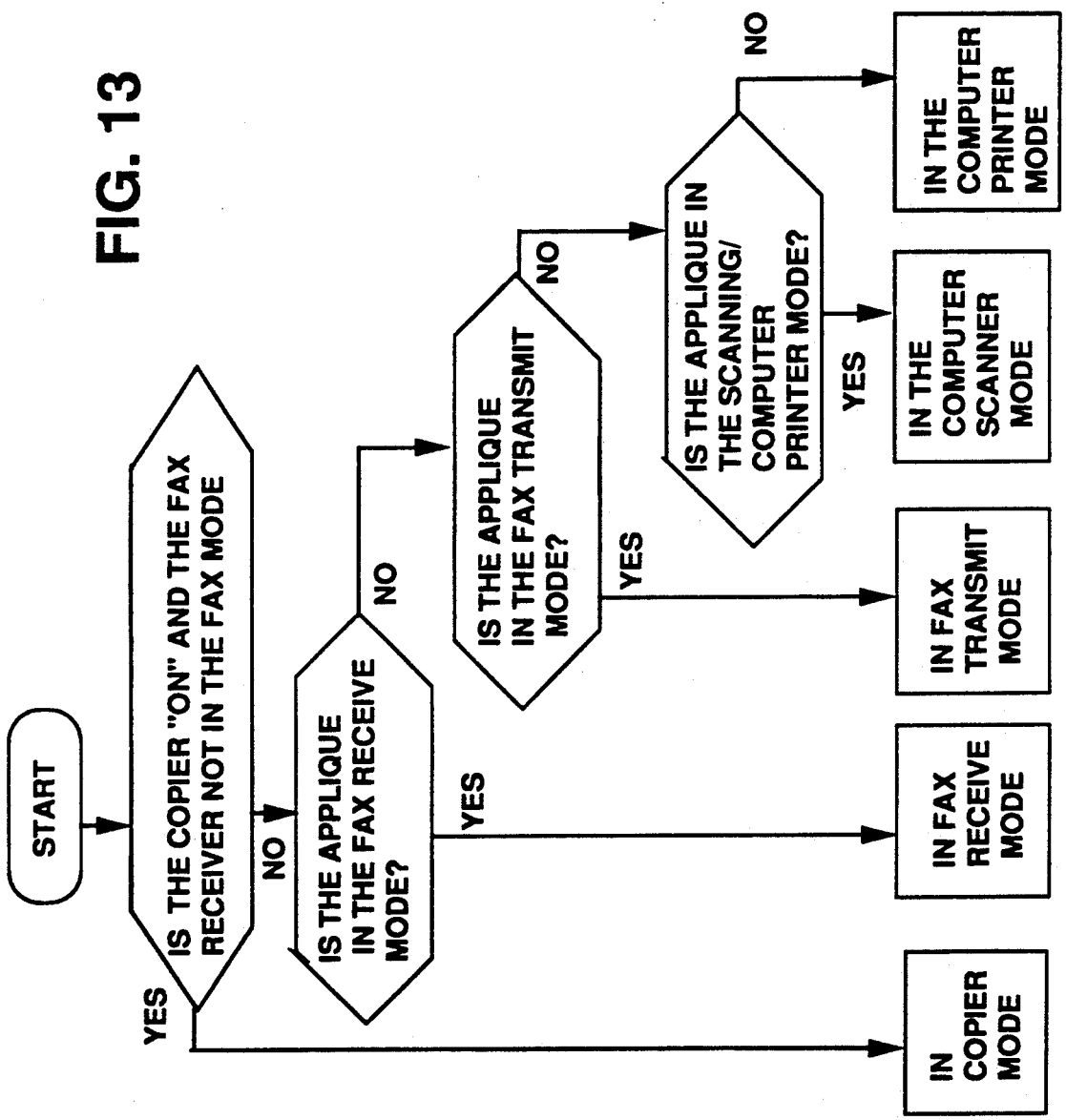
FIG. 13 is a flow chart that defines the operational state of the applique.

FIG. 13 is a simplified flow chart that defines the state of operation of the system. The following modes are permitted: copier only mode, FAX receive mode, FAX transmit mode, computer input scanner mode and computer printer mode.

Figure 14:
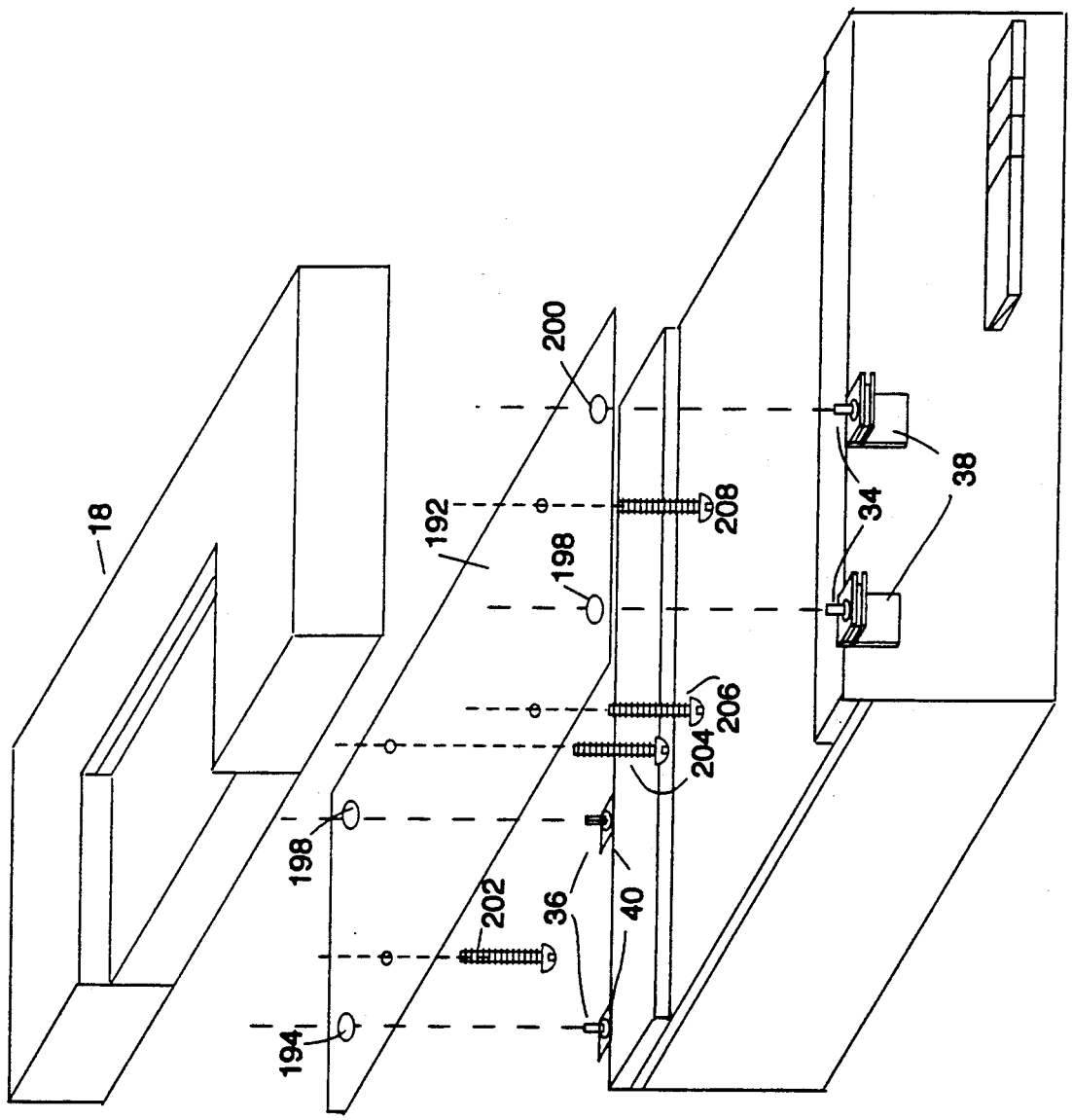
FIG. 14 is a simplified exploded perspective view of a copier and applique of the present invention showing the removable baseplate used as a template to align the mounting posts on the copier.

FIG. 14 shows how a single sized applique 18 can be mounted on a range of different copiers. Each brand and model of copier is of a slightly different size and shape, however, the differences among a large number of the units examined appear to be small. The key factor is that the lowest cost copiers tend to use a moving glass platen and are sufficiently similar in dimension so that each of them can be accommodated by manufacturing a common applique 18 for use on all of those copiers by means of a custom baseplate 192 designed for the particular copier on which the applique is to be used. Baseplate 192 is sized and shaped for attachment to the particular copier 10 and applique 18 is designed to be mounted on baseplate 192 by means of a common interface design that is independent of the size and shape of copier 10.

Each baseplate 192 has four precision holes 194–200 which fit onto four posts 34 and 36 attached to the sides or top surfaces of copier 10 on mounting blocks 38 and 40. Each of mounting blocks 38 and 40 are fastened to copier 10 either by means of adhesive or mechanical fasteners, such as self tapping screws. The mounting plate 192 is attached to applique 18 using screws 202–208. During the installation of blocks 38 and 40, baseplate 192 is used as a gross positioning guide to locate posts 34 and 36, so that their corresponding mounting blocks 38 and 40, are bonded to copier 10 so that adjustments can be more easily made to align laser beam 62 with fiber optic face plate 58 to properly sensitize drum 52 in the facsimile printing mode and when printing from memory. This is a precision adjustment, therefore, each of the four posts 34 and 36 and mounting block assemblies 30 and 38 can either be located in exactly the right position or be provided with adjustment means.

Figure 15B:
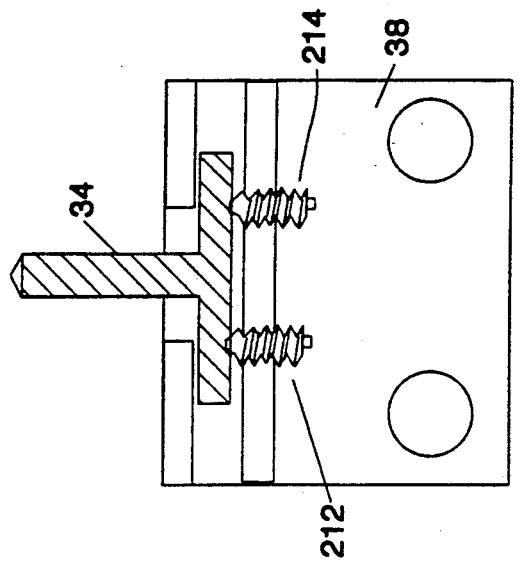
FIGS. 15a-b show details of the locking arrangement of the adjustable mounting posts for the applique.
Figure 15A:
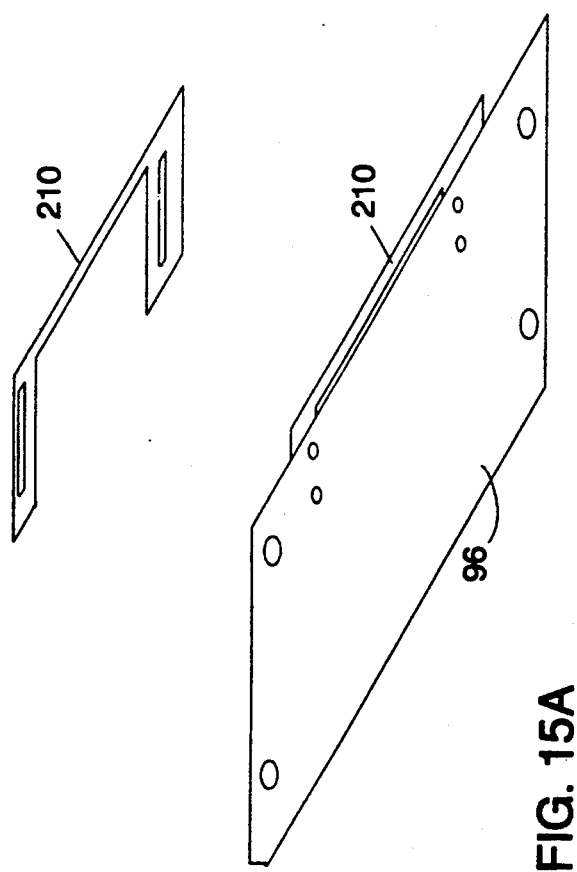

FIG. 15a shows the use of a removable slit guide 210 attached to the custom baseplate 192.

FIG. 15b shows that post 34 is adjustable in position relative to the mounting bracket 38. This is accomplished by the use of set screws 212 and 214 which may be loosened to allow the baseplate together with its slit guide 210 to exactly be aligned with slit 68 of photoreceptor cartridge 55. The purpose of slit guide 210 is to provide a narrow slit for alignment purposes. When the alignment is completed, setscrews 212 and 214 are tightened and may be locked into position with adhesive.

Some copiers are noisy and consume a significant amount of power. Thus, it is desirable that copier 10 be turned on only when it is needed, either manually or automatically whenever a facsimile message is being received. At all other times, power to copier 10 will be turned off. As shown in FIG. 16, this can be accomplished with a heavy duty power cord 46 connecting applique 18 to a wall socket with copier 10 plugged into power outlet socket 44 on applique 18. When a copy is to be made, such as when an incoming facsimile message is received, power is applied to copier 10, and the incoming facsimile message is temporarily stored in RAM 117 (in FIG. 10). Power is applied to copier 10 by the circuitry internal to applique 18 by activating relay 212 which causes normal open relay contacts 214 to close which then causes standard AC power to be applied to power socket 44 into which copier 10 has been plugged. Before the facsimile message that has been received, or a document from computer memory, is transferred to copier 10 by means of laser beam 62 for printing, it is necessary that copier 10 be at its operating temperature. To do so the current flow to copier 10 is constantly monitored in the power supply 92 in applique 18 by means of current transformer 216 and current monitoring circuit 218 to determine when copier 10 is at its operating temperature. Copier 10 is assumed to have reached its operating temperature when the current flow detected by current monitor circuit 218 drops to a lower level than the current level flowing when copier 10 was initially turned on. When copier 10 is first turned on, the maximum current drain occurs as a result of the heating of fuser roller heater 220 up to its operational temperature. When fuser roller heater 220 is at a temperature that is less than the operating temperature, thermostatic switch 244 is closed to allow current to flow through fuser roller heater 220, when fuser roller heater 220 reaches operating temperature thermostatic switch 244 opens to interrupt the flow of current through fuse roller heater 220. This switching in the current level is what is detected by current monitor circuit 218 to determine when copier 10 is ready to make the desired copy. After the fuser roller heater 220 reaches temperature, the current flow through it is cycled on and off by thermostatic switch 244 to maintain the operating temperature within the desired range. Once copier 10 is up to temperature it is possible to activate the start button of copier 10 and when platen 12 begins to move as in the normal coping mode, laser diode 60 is powered to make the desired copy. Since the position of platen 12 is monitored by applique 18, the process is automatic, and could be effected by depressing the copier's start button until platen motion is detected.

FIG. 17a and 17b show an actuator 226 attached to the skin of the copier that is used to depress the start button to initiate the copy cycle.

FIG. 17a and 17b present two views (front and side) of actuator 226 attached to the skin 232 (shown in crosshatched lines) of copier 10. The actuator's moving arm 233 engages a slidable lever 234. This slidable lever 234 depresses the copier's start button 236. This start button presses against the forced return spring and rotates on pivots 238. The actuator's magnetic coil 242 is driven by an amplifier (not shown) controlled by microprocessor 90 via copier start button actuator 242 (FIG. 9).

Although the above description of the preferred embodiment describes the use of the same scanner for reading and printing it should be obvious to one skilled in the art that a separate scanner, such as a CCD bar could be used as well.

While the present invention has been illustrated and described in its preferred embodiments, it should be understood that the invention is not limited to the precise details illustrated herein and described above since the same may be carried out in other ways falling within the scope of the invention as illustrated and described. Therefore, the scope of the present invention is only limited by the scope of the below appended claims.

What is claimed is:

1. Applique apparatus to be removably mounted on a plain paper electrostatic copier having a moving document transparent platen and internal photoreceptor means with said applique mounted above and spaced-apart from said platen after removal of the platen cover without modification of the copier for producing a system having as functions those of a copier, a laser printer for a computer, a laser document scanner, and a laser facsimile receiver and transmitter, said applique apparatus comprising:

housing means for containing the components of the applique apparatus;

means for initiating normal copier action externally to said copier;

means for monitoring the position of said platen as it moves across the top of said copier and to derive therefrom timing signals that are indicative of the position of said photoreceptor means;

means for receiving a data stream that is representative of the pixelization of a document line by line;

laser means aligned with said photoreceptor means for exposing said photoreceptor means with light in a spectral density range that will sensitize said photoreceptor means;

means for modulating said laser means with said received data stream to selectively expose said photoreceptor means in response to said data stream; and means for focusing and deflecting the light emitted by said laser means to linearize the swept light onto said photoreceptor means under control of the timing signals from said monitoring means to make a copy from said data stream.

2. Applique apparatus as in claim 1 further includes means to be affixed to the exterior surface of said copier for precisionaly locating said housing means to align the light radiated by said laser means with said photoreceptor means of said copier.

3. Applique apparatus as in claim 2 wherein said locating means is adjustable.

4. Applique apparatus as in claim 1 further includes safety interlock means to minimize the possibility of light from said laser means exiting said housing means.

5. Applique apparatus as in claim 1 further includes:

means for scanning with said laser means the image of a document for transmission as a facsimile;

means for converting said scanned image into a scanned image pixel data stream and applying said scanned image pixel data stream to said means for receiving a data stream;

facsimile transmission means coupled to said means for receiving a data stream for transmitting said scanned image pixel data stream to a remote facsimile machine;

facsimile receiving means for receiving an image from a remote facsimile machine and applying said received image to said means for receiving a data stream; and means for selecting between facsimile transmission and facsimile receiving.

6. Applique apparatus as in claim 5 wherein:
said laser means includes:
   a laser diode for generating a light beam; and
said focusing and deflecting means includes:
   means for selectively deflecting the light beam from said laser diode to the document to be scanned and to said photoreceptor means of said copier; and
   control means for selecting the deflection position of said deflection means between the scanning and the copying functions.

7. Applique apparatus as in claim 6 wherein said selective deflection means includes a pair of mirrors, one mirror for deflecting said light beam to said document to be scanned for facsimile transmission and the other mirror for deflecting said light to said photoreceptor for making a copy of a document received by facsimile reception.

8. Applique apparatus as in claim 5 wherein:
said laser means includes:
   a laser diode for generating a light beam;
   an optical beam splitter in the path of the light beam from said laser diode to separate a light beam reflected back toward said laser diode from the light beam generated by said laser diode;
   photocell means for detecting the reflected light beam separated from the light beam by said optical beam splitter and generating a signal representative of the magnitude of the reflected light to scan a document; and
   rotating multifaceted mirror means, each face for selectively scanning said light beam from said laser diode across said document to be scanned and said photoreceptor to for printing a document;
said means for focusing and deflecting includes:
   means for selectively deflecting the light beam from said laser diode to the document to be scanned and to said photoreceptor means of said copier;
   control means for selecting the deflection position of said deflection means between the scanning and the copying functions; and
   start of scan sensor means located along the leading edge of said selective deflecting means for being exposed by said light beam to generate a start of scan signal that is applied to said modulating means to start the modulation of said laser diode; and
said applique apparatus further includes programable memory means for temporary storage of said pixelized data stream.

9. Applique apparatus as in claim 1 further including:
power connector means mounted on the exterior of said housing means for receiving the power cord of said copier;
power cable means extending from said housing means for connection to a utility power outlet; and
power control means contained within said housing for interconnecting said power cable means and said power connector means for applying power to said copier when printing is to occur, for monitoring the current flow to said copier to determine when said copier is at operating temperature, and for generating a copier ready signal when said copier is up to operating temperature.

10. Applique apparatus as in claim 11 further includes mechanical copier activating means mounted exteriorly on said housing means adjacent a start print button on said copier to initiate copying in response to said copier ready signal from said power control means by depressing said start print button.

11. An attachment for converting an existing plain paper electrostatic copier into a facsimile transceiver, said attachment comprising:
   means for receiving a data stream that is representative of the pixelization of a document line by line;
   means for scanning the image on a document;
   means for converting the scanned image of said document to a pixelized data stream and applying same to said means for receiving a data stream;
   means for writing onto a photoreceptor means of the copier with a light beam modulated by said data stream from said means for receiving a data stream;
   transceiver means for selectively transmitting and receiving facsimile images via a communications channel; and
   control means for permitting user selection of the facsimile transmission or reception mode and for coordinating the necessary means for execution of that function.

12. Applique apparatus to be removably mounted on a plain paper electrostatic copier having a moving document transparent platen and internal photoreceptor means after removal of the platen cover without modification of the copier to convert said copier into a laser printer, said applique apparatus comprising:
   a universal housing;
   mounting means for external attachment to the copier to removably support said housing means above and spaced apart from said moving document transparent platen;
   document receiving means located in said housing for receiving a data stream representation of a document to be printed;
   laser diode scanning, synchronization and control means contained in said housing for modulating said laser diode with said data stream to create a modulated laser beam and for directing said modulated laser beam to said photoreceptor means of said copier for writing said document onto said photoreceptor means; and
   baseplate means sized and shaped to fit said copier and to be removably affixed to said mounting means on said copier for receiving and precisionaly locating said universal housing means so that said laser beam from said laser means is aligned to write said document onto said photoreceptor means.

13. Applique apparatus as in claim 12 further including:
power connector means mounted on the exterior of said housing means for receiving the power cord of said copier;
power cable means extending from said housing means for connection to a utility power outlet; and power control means contained within said housing for interconnecting said power cable means and said power connector means for applying power to said copier when printing is to occur, for monitoring the current flow to said copier to determine when said copier is at operating temperature, and for generating a copier ready signal when said copier is up to operating temperature.

14. Applique apparatus as in claim 13 further includes mechanical copier activating means mounted exteriorly on said housing means adjacent a start print button on said copier to initiate copying in response to said copier ready signal from said power control means by depressing said start print button.

15. An applique to be removably mounted on an existing copier to extend the function of said copier to include that of an electronic printer and a document scanner with said copier having a moving photoreceptor surface interior thereto, said applique comprises:

a laser diode capable of radiating a focused beam of light within the spectral band of sensitivity of said photoreceptor surface of said copier;

means for scanning said light beam from said laser diode perpendicular to and synchronous with the position of said photoreceptor surface;

means for modulating the intensity of the light beam from said laser diode with the pixel image of each line that is to be printed;

means for precisely aligning the path of said light beam relative to the position of said photoreceptor surface; and means for precisely adjusting the position of said applique relative to said copier and maintaining that position during use of said applique.

16. An applique as in claim 15 further comprises means for preventing said light beam of said laser diode from being visible to the naked eye of any individual in the vicinity of the applique while in use.

17. An applique as in claim 15 further comprises means for precisely repositioning said applique upon a copier on which it had been previously mounted without having to readjust and realign the applique to the copier.

18. An applique as in claim 15 wherein said laser diode emits a light beam in the range of 850-890 nanometers at a radiated power level of between one milliwatt and ten milliwatts.

* * * * *